(12) United States Patent
Otsuka et al.

(10) Patent No.: US 10,612,638 B2
(45) Date of Patent: Apr. 7, 2020

(54) SPEED REDUCER WITH ELECTRIC MOTOR

(71) Applicants: NIDEC-SHIMPO CORPORATION, Kyoto (JP); NIDEC CORPORATION, Kyoto (JP)

(72) Inventors: Tomoyuki Otsuka, Kyoto (JP); Takuro Yonemura, Kyoto (JP); Tsuyoshi Hirokawa, Kyoto (JP); Kosuke Mizuike, Kyoto (JP)

(73) Assignees: NIDEC-SHIMPO CORPORATION, Kyoto (JP); NIDEC CORPORATION, Kyoto (JP)

( * ) Notice: Subject to any disclaimer, the term of this patent is extended or adjusted under 35 U.S.C. 154(b) by 47 days.

(21) Appl. No.: 15/780,640

(22) PCT Filed: Nov. 29, 2016

(86) PCT No.: PCT/JP2016/085393
§ 371 (c)(1),
(2) Date: Jun. 1, 2018

(87) PCT Pub. No.: WO2017/094715
PCT Pub. Date: Jun. 8, 2017

(65) Prior Publication Data
US 2018/0355964 A1 Dec. 13, 2018

(30) Foreign Application Priority Data
Dec. 1, 2015 (JP) .................................. 2015-234946

(51) Int. Cl.
*F16H 49/00* (2006.01)
*F16H 1/32* (2006.01)
(Continued)

(52) U.S. Cl.
CPC ............. *F16H 49/001* (2013.01); *F16H 1/32* (2013.01); *F16H 57/02* (2013.01); *H02K 7/116* (2013.01);
(Continued)

(58) Field of Classification Search
CPC ......... F16H 2057/02034; F16H 49/001; F16H 57/02; H02K 21/12; H02K 7/116
(Continued)

(56) References Cited

U.S. PATENT DOCUMENTS

2009/0139356 A1* 6/2009 Inoue ..................... B62D 5/008
74/393
2010/0269770 A1* 10/2010 Kokubo .................. F01L 1/022
123/90.15
(Continued)

FOREIGN PATENT DOCUMENTS

DE 112013005396 8/2015
JP S60-166259 11/1985
(Continued)

OTHER PUBLICATIONS

"International Search Report (Form PCT/ISA/210)" of PCT/JP2016/085393, dated Mar. 7, 2017, with English translation thereof, pp. 1-4.

*Primary Examiner* — Jermele M Hollington
*Assistant Examiner* — Rashad H Johnson
(74) *Attorney, Agent, or Firm* — JCIPRNET

(57) ABSTRACT

In a speed reducing unit with an electric motor, a speed reduction mechanism has: an elliptical cam that rotates together with a rotating part; a flexible external gear that deforms according to the rotation of the elliptical cam; a flexible bearing that is located between the elliptical cam and the flexible external gear; and a movable internal gear that rotates together with an output part. The flexible exter-
(Continued)

nal gear and the movable internal gear are engaged with each other. The electric motor has: a rotor holder that is part of the rotating part and that rotates together with the elliptical cam; a rotor magnet that is fixed to the rotor holder; and a stator that is fixed to a casing. The rotor holder has a rotor-holder lid part, and the positions of the rotor-holder lid part and the flexible bearing in the axial direction at least partially overlap.

8 Claims, 5 Drawing Sheets

(51) Int. Cl.
*F16H 57/02* (2012.01)
*H02K 7/116* (2006.01)
*H02K 21/22* (2006.01)

(52) U.S. Cl.
CPC ... *H02K 21/22* (2013.01); *F16H 2057/02034* (2013.01)

(58) Field of Classification Search
USPC ..................................... 310/75 R, 83; 74/640
See application file for complete search history.

(56) References Cited

U.S. PATENT DOCUMENTS

| | | | | |
|---|---|---|---|---|
| 2011/0245006 | A1* | 10/2011 | Negishi | B25J 9/1025 475/149 |
| 2012/0312259 | A1* | 12/2012 | Yamanaka | F01L 1/352 123/90.15 |
| 2013/0324342 | A1* | 12/2013 | Onozaki | B60K 6/365 475/150 |
| 2014/0123922 | A1* | 5/2014 | Tadokoro | F01L 1/344 123/90.17 |
| 2014/0373795 | A1* | 12/2014 | Yamanaka | F01L 1/344 123/90.11 |
| 2015/0008774 | A1* | 1/2015 | Yamanaka | H02K 11/0094 310/71 |

FOREIGN PATENT DOCUMENTS

| | | |
|---|---|---|
| JP | H10164797 | 6/1998 |
| WO | 2014203294 | 12/2014 |
| WO | 2015037105 | 3/2015 |

* cited by examiner

SPEED REDUCER WITH ELECTRIC MOTOR

CROSS-REFERENCE TO RELATED APPLICATION

This application is a 371 application of the international PCT application serial no. PCT/JP2016/085393, filed on Nov. 29, 2016, which claims the priority benefit of Japan application no. 2015-234946, filed on Dec. 1, 2015. The entirety of each of the abovementioned patent applications is hereby incorporated by reference herein and made a part of this specification.

TECHNICAL FIELD

The present invention relates to a speed reducer with an electric motor.

BACKGROUND ART

A conventional speed reducer with an electric motor that includes an electric motor and a speed reducer and decelerates the power obtained from the electric motor and outputs the power is known. FIG. 5 is a diagram schematically illustrating a structure of a conventional speed reducer 1X with an electric motor. The speed reducer 1X with an electric motor has an electric motor 20X, a speed reduction mechanism 30X, and an output part 40X that rotates at a decelerated rotation speed. In the example of FIG. 5, however, the electric motor 20X, the speed reduction mechanism 30X, and the output part 40X are disposed in the direction of the center axis 9X (the axial direction) of the electric motor 20X. For this reason, the dimension of the speed reducer 1X with an electric motor in the axial direction becomes longer. Therefore, the speed reducer 1X with an electric motor having the structure of FIG. 5 is unsuitable for applications with severe restrictions on dimensions in the axial direction, like joint parts of working robots and assist suits, turntables, wheel-in dividing plates, and the like.

In order to restrict the dimension of the speed reducer with an electric motor in the axial direction, for example, providing the electric motor around a rotation axis and disposing the speed reduction mechanism on the outer circumference side of the electric motor in a concentric shape are considered. In that way, the electric motor and the speed reduction mechanism are disposed at a position in the same axial direction, and thus the speed reducer with the electric motor can have a thin shape in the axial direction as a whole. Patent Literature 1, for example, discloses such a conventional speed reducer with an electric motor in which a speed reduction mechanism is disposed on an outer circumference side of the electric motor.
[Patent Literature 1]
Japanese Utility Model Publication No. S60-166259

SUMMARY OF INVENTION

Technical Problem

Patent Literature 1 introduces a structure in which a harmonic gear is disposed as a speed reducer on an outer side of the outer rotor-type electric motor. In the structure disclosed in the publication, however, it is necessary to support a stator yoke of the electric motor and a movable circular spline with a member different from the constituent components (members other than the device) illustrated in FIG. 1 of the publication. Therefore, it is not possible to treat the elements as an independent assembly only with the constituent components illustrated in FIG. 1 of the publication. In addition, since a separate member to support the stator yoke and the movable circular spline is needed, a thickness in the axial direction is further needed at the time of actual uses accordingly.

In addition, in the structure disclosed in Patent Literature 1, there is no supporting shaft of a rotor yoke. For this reason, the rotor yoke is supported by the circular spline via a web generator. In this structure, rotation postures of the rotor yoke become unstable. Therefore, leads may tilt or a pitch circle may change, thus it is not possible to gain normal tooth contact, and noise and vibration are likely to occur. In addition, a gear is likely to be damaged and cannot bear a high load.

An objective of the present invention is to provide a speed reducer with an electric motor that can bear a high load and can be treated as an independent assembly.

Solution to Problem

An exemplary first invention of the present application is a speed reducing unit with an electric motor which includes a casing, an electric motor having a rotating part that rotates around an axis of the casing; a speed reduction mechanism that transmits a rotational motion of the electric motor while decelerating; an output part that rotates at a decelerated rotation speed; a first bearing that rotatably connects the casing or a member fixed to the casing to the rotating part; and a second bearing that rotatably connects the casing to the output part, in which the speed reduction mechanism is a speed reduction mechanism having an elliptical cam that rotates together with the rotating part; a flexible external gear that deforms according to the rotation of the elliptical cam; a flexible bearing that is located between the elliptical cam and the flexible external gear, and a movable internal gear that rotates together with the output part, the flexible external gear and the movable internal gear are engaged with each other, and the flexible external gear and the movable internal gear rotate relative to each other due to a difference in the number of teeth, and the electric motor has a rotor holder that is part of the rotating part and that rotates together with the elliptical cam, a rotor magnet that is fixed to the rotor holder, and a stator that is fixed to the casing or a member fixed to the casing and that is opposed to the rotor magnet, the rotor holder has a rotor-holder lid part that is opposed to the stator in an axial direction directly or via another member, and positions of the rotor-holder lid part and the flexible bearing in the axial direction at least partially overlap.

Advantageous Effects of Invention

According to the first exemplary invention of the present application, the positions of the rotor-holder lid part and the flexible bearing in the axial direction at least partially overlap. Accordingly, when a force is applied to the rotor holder via the flexible bearing, the width of the rotor-holder lid part in the radial direction increases, and thus the rotor holder can be supported without deformation. In addition, all members included in the speed reducer with the electric motor are directly or indirectly supported by the casing. Thus, the speed reducer with the electric motor can be treated as an independent assembly.

DESCRIPTION OF EMBODIMENTS

Exemplary embodiments of the present invention will be described with reference to the drawings. Note that, in the present application, a direction parallel to a rotation axis of an electric motor will be referred to as an "axial direction," a direction orthogonal to the rotation axis will be referred to as a "radial direction," and a direction along a circular arc having the rotation axis as a center will be referred to as a "circumferential direction." However, the above-described "parallel direction" also includes a substantially parallel direction. In addition, the above-described "orthogonal direction" also includes a substantially orthogonal direction.

1. First Embodiment

Figure 1:
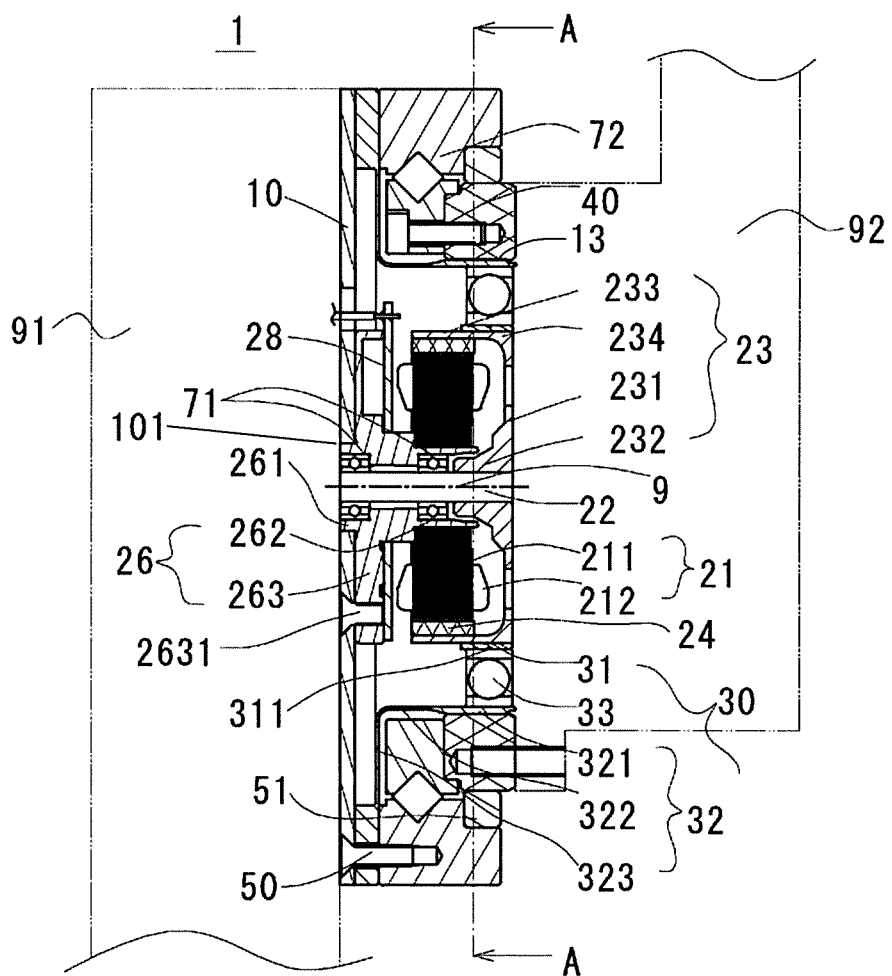
FIG. 1 is a vertical sectional view of a speed reducer with an electric motor according to a first embodiment.
Figure 2:
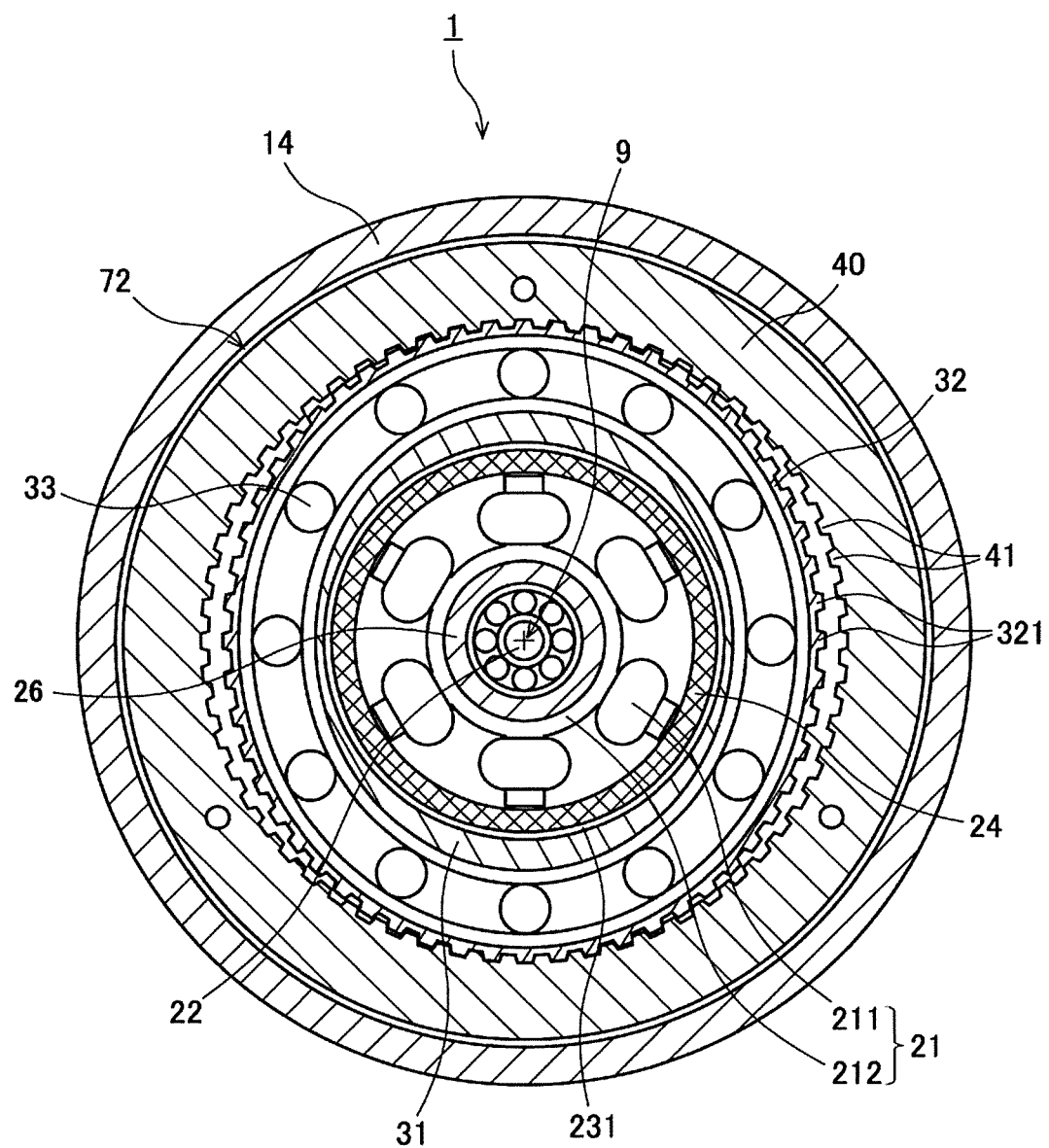
FIG. 2 is a horizontal sectional view of the speed reducer with an electric motor according to the first embodiment.

FIG. 1 is a vertical sectional view of a speed reducer 1 with an electric motor according to a first embodiment of the present invention. FIG. 2 is a horizontal sectional view of the speed reducer 1 with an electric motor viewed from the A-A position of FIG. 1. The speed reducer 1 with an electric motor is a device that converts a rotational motion having a first rotation speed obtained from the electric motor 20 into a rotational motion having a second rotation speed that is lower than the first rotation speed and thereby rotates an output part 40. The speed reducer 1 with the electric motor is used while incorporated into, for example, a joint part of an arm of a working robot to realize bending and stretching motions of the arm. However, the speed reducer with an electric motor of the present invention may be incorporated into other equipment such as an assist suit, a turntable, a dividing plate of a machine tool, a wheel chair, or an automatic guided vehicle to realize various types of rotational motions.

As illustrated in FIG. 1 and FIG. 2, the speed reducer 1 with an electric motor of the present embodiment has a casing 10, the electric motor 20, a speed reduction mechanism 30, and the output part 40.

The casing 10 is a metal member that directly or indirectly supports the speed reducer 1 with the electric motor. The casing 10 is fixed to, for example, an arm member 91 on a base end side among two arm members 91 and 92 constituting an arm of a working robot through screwing. As illustrated in FIG. 2, the casing 10 is a disk-shaped member and has an opening part 101 at the center of the casing 10, which opens in a direction parallel to a rotation axis 9. The casing 10 is disposed to be substantially perpendicular to the rotation axis 9. The electric motor 20 is fixed to the casing 10.

The electric motor 20 is a driving source that generates rotational motions in accordance with drive currents. The electric motor 20 has a stator 21, a shaft 22, a rotor holder 23, a rotor magnet 24, a bracket 26, and a circuit board 28. The stator 21 is supported by the casing 10 via the bracket 26. The stator 21 is stationary relative to the casing 10. The shaft 22, the rotor holder 23, and the rotor magnet 24 are rotatably supported with respect to the casing 10. That is, in the present embodiment, the stator 21 and the bracket 26 constitute a stationary part of the electric motor 20, and the shaft 22, the rotor holder 23, and the rotor magnet 24 constitute a rotating part of the electric motor 20.

The bracket 26 is a cylindrical member and has a lower cylindrical part 261, an upper cylindrical part 262, and a flange part 263. The lower cylindrical part 261 is a cylindrical portion that extends in a direction parallel to the rotation axis 9. A first bearing 71, which will be described below, is fixed to an inner circumferential surface of the lower cylindrical part 261. An outer circumferential surface of the lower cylindrical part 261 is in contact with an inner circumferential surface of the opening part 101 of the casing 10. The upper cylindrical part 262 is a cylindrical portion that extends in a direction parallel to the rotation axis 9. The first bearing 71, which will be described below, is fixed to an inner circumferential surface of the upper cylindrical part 262. The flange part 263 is a portion that is positioned between the lower cylindrical part 261 and the upper cylindrical part 262 and projects outward in the radial direction of the upper cylindrical part 262 and the lower cylindrical part 261. A screw hole 2631 that opens in the axial direction is provided in the flange part 263, and the casing 10 is fixed to the bracket 26 when a screw is inserted into the screw hole 2631.

The stator 21 has an annular stator core 211 having a plurality of protruding pole parts and a coil 212 wound around each of the protruding pole parts. An inner circumferential surface of the stator core 211 is fixed to an outer circumferential surface of the upper cylindrical part 262 of the bracket 26 with, for example, press fitting or an adhesive.

The shaft 22 is a columnar member disposed along the rotation axis 9. At least a part of the shaft 22 is disposed within the upper cylindrical part 262 of the bracket 26. The first bearing 71 is located between the shaft 22 and the upper cylindrical part 262. The inner ring of the first bearing 71 is fixed to an outer circumferential surface of the shaft 22. In addition, the outer ring of the first bearing 71 is fixed to the inner circumferential surface of the upper cylindrical part 262.

In addition, the first bearing 71 is located between the shaft 22 and the lower cylindrical part 261. The inner ring of the first bearing 71 is fixed to the outer circumferential surface of the shaft 22. In addition, the outer ring of the first bearing 71 is fixed to the inner circumferential surface of the lower cylindrical part 261.

In the present embodiment, a ball bearing is used for the first bearing 71. In addition, instead of the ball bearing, a bearing of another type such as a roller bearing, a cross roller bearing, a sliding bearing, or a fluid dynamic bearing may be used. In addition, another member may be located between the inner ring of the first bearing 71 and the shaft 22, or between the outer ring of the first bearing 71 and the bracket 26. Furthermore, the number of the first bearings 71 may be one, or three or more. In addition, the first bearing 71 may be fixed to a portion other than the shaft.

The rotor holder 23 is a cup-shaped member connecting the shaft 22 to the rotor magnet 24. More specifically, the rotor holder 23 has a disk-shaped rotor-holder lid part 231, a fixing part 232 positioned at an inner end of the rotor-holder lid part 231, and a tubular part 233 that is positioned at an outer end of the rotor-holder lid part 231 and hanging downward in the axial direction. The fixing part 232 has a cylindrical shape extending from the rotor-holder lid part 231 downward in the axial direction, and the shaft 22 is inserted into the fixing part 232. The rotor holder 23 is fixed to the shaft 22 by the fixing part 232. An enlarged diameter part 2321 having a diameter increasing toward the upper side in the axial direction is provided at a portion of the fixing part 232 at which the rotor holder 23 is connected to the rotor-holder lid part 231. By including the enlarged diameter part 2321, the strength of the rotor holder 23 can be increased, and thus the rotor holder can cope with a larger load. The tubular part 233 of the rotor holder 23 has an inner circumferential surface that is coaxial with the rotation axis 9. The rotor-holder lid part 231 has a connecting part 234 whose thickness in the axial direction increases toward the tubular part 233. Although a cross-sectional shape of the connecting part 234 is an R shape in the present embodiment, the present invention is not limited thereto, and may be an inclined surface or a curved surface. Since strength of the rotor holder 23 can be increased by the connecting part 234, the rotor holder can cope with a larger load. The rotor magnet 24 is fixed to an inner circumferential surface of the tubular part 233 with, for example, an adhesive. In the present embodiment, the rotor magnet 24 is positioned on an outer side of the stator 21 in the radial direction. Note that the rotor magnet 24 may be a single ring magnet in which the N pole and the S pole are alternately magnetized in the circumferential direction, or may be a plurality of segment magnets divided for each magnetic pole. In addition, the inner circumferential surface of the tubular part 233 may not be a perfect circle in a plan view, but may be, for example, a polygon in the plan view. In addition, a groove may be formed.

When a drive current is supplied to the coil 212 via the circuit board 28, a magnetic flux is generated at each protruding pole part of the stator core 211. In addition, due to the action of the magnetic flux between the protruding pole part and the rotor magnet 24, torque is generated in the circumferential direction. As a result, the shaft 22, the rotor holder 23, and the rotor magnet 24 rotate around the rotation axis 9 at the first rotation speed. Note that, in the present embodiment, a three-phase brushless motor that is suitable for drive of arms of working robots is used for the electric motor 20. However, the electric motor used in the present embodiment may not necessarily be a three-phase brushless motor, and may be, for example, a stepping motor.

The circuit board 28 has a magnetic sensor (not illustrated) that detects magnetic fluxes of the rotor magnet 24 in addition to a wiring pattern for supplying drive currents to the coil 212. The magnetic sensor is, for example, a Hall IC. Rotation of the rotating part of the electric motor 20 can be detected by the magnetic sensor.

The speed reduction mechanism 30 is a mechanism that transmits rotational motions obtained from the electric motor 20 to the output part 40 while decelerating the motions. For the speed reduction mechanism 30 of the speed reducer 1 with the electric motor, a so-called wave gear mechanism using a flexible gear is used. The speed reduction mechanism 30 has a cam 31, a flexible external gear 32, and a flexible bearing 33 as illustrated in FIG. 1 and FIG. 2. In addition, a part of each of the casing 10 and the output part 40 serves as a constituent element of the speed reduction mechanism 30 as an internal gear in the present embodiment.

The cap 31 is an annular member fixed to the outer circumferential surface of the rotor holder 23. The cam 31 has an elliptical outer circumferential surface when viewed in the axial direction as illustrated in FIG. 2. In other words, the cam 31 is an elliptical cam. The flexible external gear 32 is a flexible ring-shaped gear. The flexible external gear 32 of the present embodiment has a tubular part 322 and a flange part 323. The tubular part 322 deforms according to the rotation of the cam 31. In addition, a plurality of external teeth 231 are provided on an outer circumferential surface of the tubular part 322 at a constant pitch. The flange part 323 widens toward the outer side in the radial direction from one end part of the tubular part 322, and is fixed to an end surface of the casing in the axial direction through, for example, screwing. In addition, the flange part 323 is also fixed to an outer ring of a second bearing 72, which will be described below. In the present embodiment, the flange part 323 is fixed to the outer ring of the second bearing 72 by a screw 50. A flexible bearing 33 is located between the cam 31 and the flexible external gear 32. An inner ring of the flexible bearing 33 is flexible and is fixed to the cam 31 along the elliptical outer circumferential surface thereof. An annular adhesive groove 311 inwardly receding in the radial direction is positioned on an outer circumferential surface of the cam 31, and the inner ring of the flexible bearing 33 is fixed to the outer circumferential surface of the cam 31 with an adhesive. Because the adhesive groove 311 is included, the flexible bearing 33 is reliably fixed to the cam 31. The outer ring of the flexible bearing 33 is fixed to an inner circumferential surface of the flexible external gear 32 and thereby deforms together with the flexible external gear 32. A plurality of spheres are located between the inner ring and the outer ring of the flexible bearing 33.

The output part 40 is a circular member disposed between the flexible external gear 32 and the outer ring of the second bearing 72, which will be described below. The output part 40 is fixed to an arm member 92 on a distal end side among two arm members 91 and 92 constituting, for example, an arm of a working robot, through screwing. A plurality of internal teeth 41 are provided on the inner circumferential surface of the output part 40 in the circumferential direction at a constant pitch as illustrated in FIG. 2. In addition, the second bearing 72 is located between the output part 40 and the casing 10. Specifically, the output part 40 is fixed to the inner ring of the second bearing 72. Note that the output part 40 may be connected to the inner ring of the second bearing using another member. In addition, the output part 40 itself may be the inner ring of the second bearing.

In the present embodiment, a cross roller bearing is used as the second bearing 72. The second bearing 72 has a plurality of cylindrical rollers between the outer circumferential surface of the output part 40 and an inner circumferential surface of an outer cylindrical part 14. The plurality of cylindrical rollers are disposed between an annular V groove provided on the outer circumferential surface of the output part 40 and an annular V groove provided on the inner circumferential surface of the outer cylindrical part 14 while alternately changing their directions. Accordingly, the output part 40 and the outer cylindrical part 14 are connected with high rigidity while allowing mutual rotation. Note that an oil seal 51 is disposed between the output part 40 and the second bearing 72. The oil seal 51 prevents dust from entering the inside of the second bearing 72 from the outside.

Such cross roller bearings can obtain necessary rigidity in the axial direction and the radial direction without using the bearing as a pair like ball bearings. That is, by using cross roller bearings, the number of bearings located between the output part 40 and the outer cylindrical part 14 can be reduced. Accordingly, the weight of the second bearing 72 can be reduced, and the dimension of the second bearing 72 in the axial direction can be restricted.

When the cam 31 rotates along with the rotor holder 23, the shape of the flexible external gear 32 changes in accordance with the rotation of the cam 31. That is, although the flexible external gear 32 has an elliptical shape in accordance with the shape of the outer circumferential surface of the cam 31 when the gear is viewed in the axial direction, the long axis of the ellipse rotates following the rotation of the cam 31.

The plurality of external teeth 321 of the flexible external gear 32 are engaged with the plurality of internal teeth 41 of the output part 40. In the present embodiment, the number of internal teeth 41 provided in the output part 40 is different from the number of external teeth 321 provided in the flexible external gear 32. For this reason, the positions of external teeth 321 of the flexible external gear 32 that are engaged with the internal teeth at the same position of the internal teeth 41 are displaced at every rotation of the cam 31. Accordingly, the output part 40 slowly rotates around the rotation axis 9.

In addition, in the speed reducer 1 with an electric motor, all the elements included in the device including the electric motor 20, the speed reduction mechanism 30, and the output part 40 are directly or indirectly supported by the casing 10. For this reason, it is not necessary to support some of the elements included in the speed reducer 1 with the electric motor with an external member. Therefore, the speed reducer 1 with the electric motor can be treated as an independent assembly.

In addition, in the speed reducer 1 with the electric motor, the rotating part of the electric motor 20, the speed reduction mechanism 30, and the output part 40 are supported between the first bearing 71 and the second bearing 72. Accordingly, rotation postures of the rotating part of the electric motor 20, the speed reduction mechanism 30, and the output part 40 become stable. As a result, vibration and noise generated when the speed reducer 1 with the electric motor is driven can be reduced. In addition, it is possible to prevent the flexible external gear 32, a fixed internal gear part 13, and the output part 40 from being damaged due to engagement with each other.

In particular, when the speed reducer 1 with the electric motor is made thin in the axial direction, the ratio of the dimension thereof in the radial direction to the dimension thereof in the axial direction increases. For this reason, as the speed reducer becomes thinner, it generally becomes technically difficult to stabilize rotation postures of the rotating part of the electric motor 20, the speed reduction mechanism 30, and the output part 40. If the structure of the present embodiment is employed, however, thinning of the speed reducer 1 with the electric motor in the axial direction can be compatible with stabilizing rotation postures of the rotating part of the electric motor 20, the speed reduction mechanism 30, and the output part 40 as described above.

2. Second Embodiment

Figure 3:
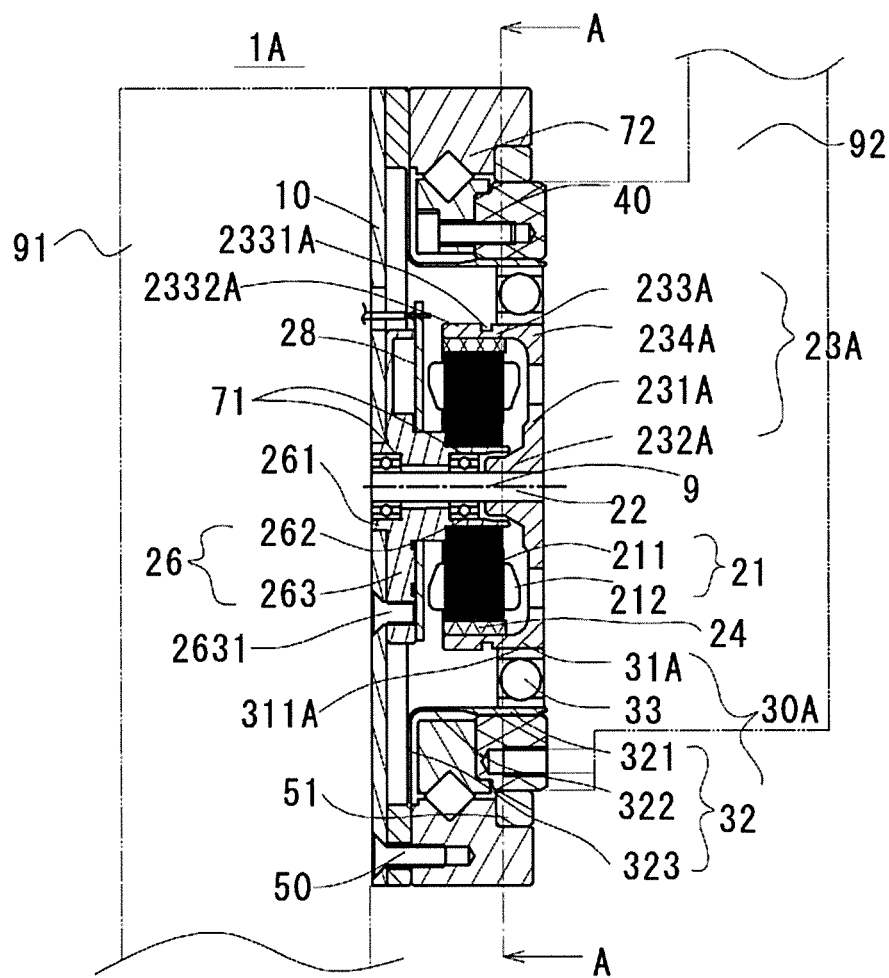
FIG. 3 is a vertical sectional view of a speed reducer with an electric motor according to a second embodiment.
Figure 4:
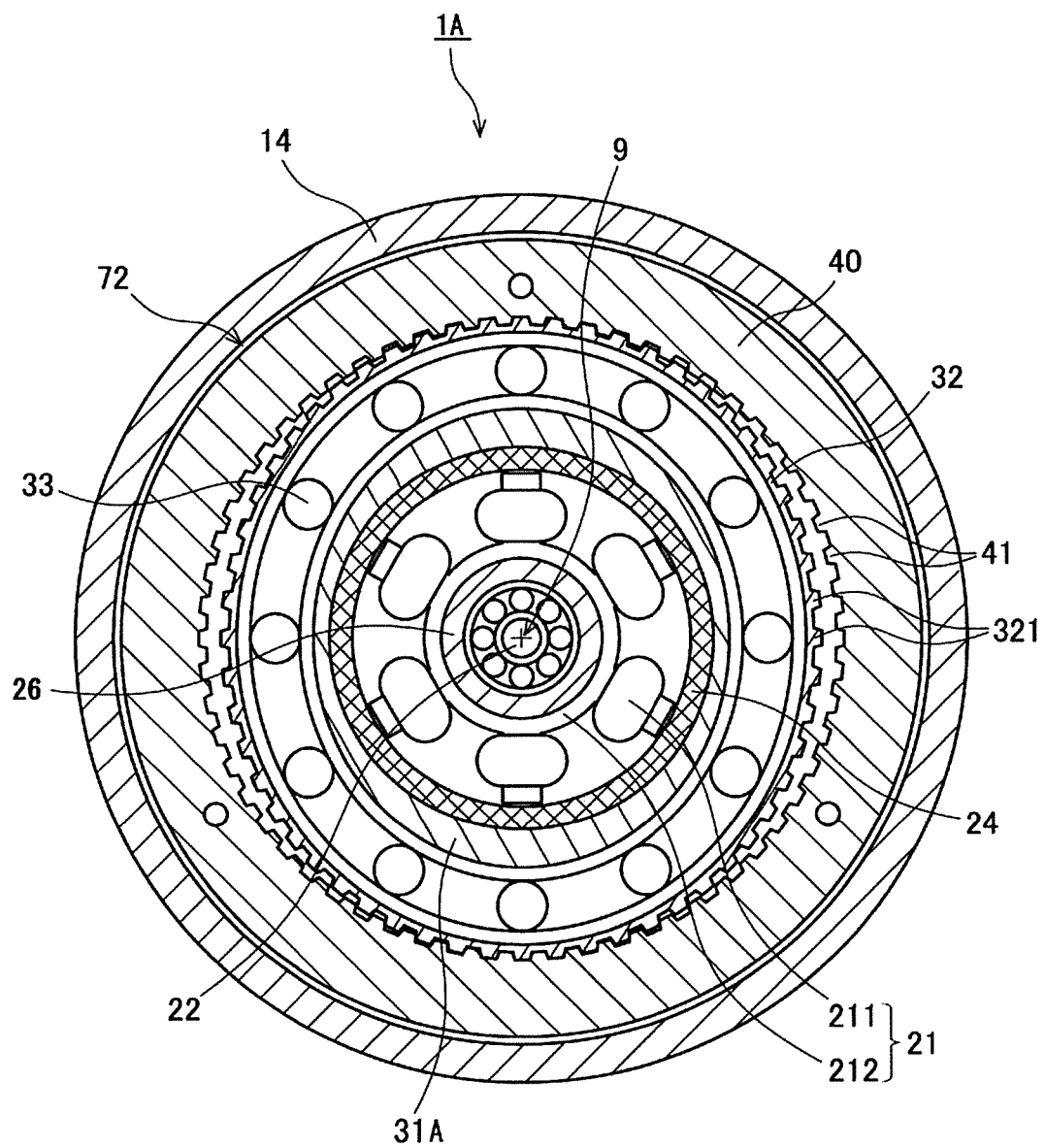
FIG. 4 is a horizontal sectional view of the speed reducer with an electric motor according to the second embodiment.
Figure 5:
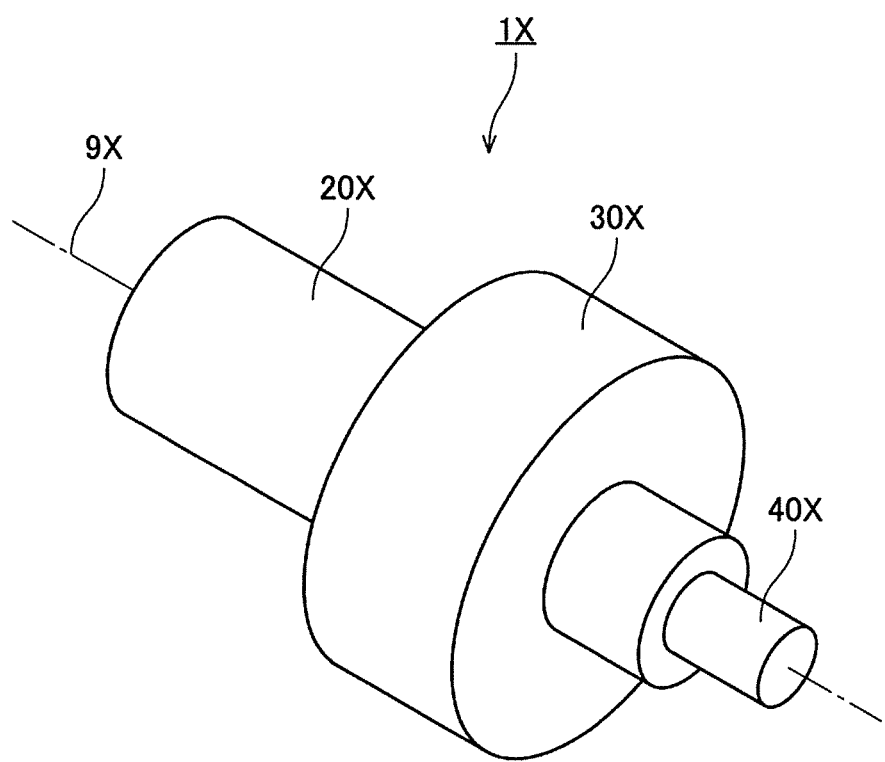
FIG. 5 is a diagram schematically illustrating a structure of a conventional speed reducer 1X with an electric motor.

Next, a second embodiment of the present invention will be described. FIG. 3 is a vertical sectional view of a speed reducer 1A with an electric motor according to the second embodiment. FIG. 4 is a horizontal sectional view of the speed reducer 1A with an electric motor according to the second embodiment. Note that differences from the first embodiment will be mainly described below, and overlapping description on parts equivalent to those of the first embodiment will be omitted.

The speed reducer 1A with an electric motor according to the present embodiment has a casing 10, an electric motor 20A, a speed reduction mechanism 30A, and an output part 40 as illustrated in FIG. 3.

The rotor holder 23 and the cam 31 are configured as separate members in the above-described first embodiment. On the other hand, in the present embodiment, a rotor holder 23A and a cam 31A are connected together. In other words, in the present embodiment, the rotor holder 23A and the cam 31A are a single member. Since the rotor holder 23A and the cam 31A are connected together, the number of parts can be reduced. A structure of the electric motor 20A of the present embodiment will be described below.

The rotor holder 23A of the electric motor 20A is a cup-shaped member connecting a shaft 22 to a rotor magnet 24. More specifically, the rotor holder 23A has a disk-shaped rotor-holder lid part 231A, a fixing part 232A positioned at an inner end of the rotor-holder lid part 231A, and a tubular part 233A that is positioned at an outer end of the rotor-holder lid part 231A and hanging downward in the axial direction. The fixing part 232A has a cylindrical shape extending downward from the rotor-holder lid part 231A in the axial direction, and the shaft 22 is inserted into the fixing part 232A. The rotor holder 23A is fixed to the shaft 22 by the fixing part 232A. An enlarged diameter part 2321A having a diameter increasing toward an upper side in the axial direction is provided at a portion of the fixing part 232A at which the rotor holder 23A is connected to the rotor-holder lid part 231A. The tubular part 233A of the rotor holder 23A has an inner circumferential surface coaxial with a rotation axis 9. The rotor-holder lid part 231A has a connecting part 234A whose thickness in the axial direction increases toward the tubular part 233A. In addition, the rotor-holder lid part 231A including the connecting part 234A at least partially overlaps a position of a flexible bearing 33 in the axial direction. Although a cross-sectional shape of the connecting part 234A is an R shape in the present embodiment, a shape thereof is not limited thereto and may be an inclined surface or a curved surface. Since strength of the rotor holder 23A can increase due to the enlarged diameter part 2321A and the connecting part 234A as in the above-described first embodiment, the rotor holder can cope with a larger load.

The tubular part 233A of the rotor holder 23A has the cam 31A having an elliptical outer circumferential surface in the axial direction. In other words, the cam 31A is an elliptical cam. In addition, the cam 31A (elliptical cam) and the rotor holder 23A are connected together. In other words, the elliptical cam and the rotor holder 23A are a single member. An annular adhesive groove 311A inwardly receding in the radial direction is positioned on the outer circumferential surface of the cam 31A.

In addition, the rotor holder 23A has an annular groove 2331A, and a circular part 2332A positioned below the groove 2331A below the cam 31A in the tubular part 233A. The groove 2331A separates the cam 31A from the circular part 2332A. In other words, a bottom surface of the groove 2331A has a smaller diameter than a portion of the cam 31A having the smallest diameter and the circular part 2332A.

The circular part 2332A has a cylindrical outer circumferential surface that is coaxial with the rotation axis 9, and an outer circumferential surface thereof has a larger diameter than or has the same diameter as a portion of the cam 31A having the largest diameter. Since the cam 31A and the circular part 2332A are separated by the groove 2331A, each of the cam 31A and the circular part 2332A can be processed with high accuracy. In particular, in a case in which the rotor holder 23A is obtained through cutting, the rotor holder can be processed with high accuracy.

Although the tubular part 233A of the rotor holder 23A has the cam 31A, the groove 2331A, and the circular part 2332A, the positions of the rotor-holder lid part 231A and the cam 31A in the axial direction overlap each other.

Accordingly, even when a large load is imposed on the output part 40, a load imposed on a flexible bearing 33 can be received by the rotor-holder lid part 231A. Therefore, even when an external force with a large load is imposed, it is possible to cope with the force.

In addition, more than half of the area of a rotor magnet 24 in the axial direction overlaps the position of the circular part 2332A in the axial direction. Since the accuracy of the circular part 2332A can be increased, mounting accuracy of the rotor magnet 24 can also be improved. In addition, the cam 31A having a structure of receiving a torque reaction force from a gear can be compatible with circularity of a portion of the tubular part 233A holding the rotor magnet 24. Furthermore, since an entire outer circumferential surface of the tubular part 233A is not elliptical, when the invention is applied to another model having a changed capacity of an electric motor, it is possible to deal with the model by appropriately adjusting only a length of the circular part 2332A of the tubular part 233A. In addition, since the circular part 2332A having high rigidity is positioned on an opening side of the tubular part 233A, it is possible to keep the cam 31A at high rigidity while maintaining high accuracy.

3. Modified Example

Although exemplary embodiments of the present invention have been described above, the present invention is not limited thereto.

Although the outer rotor-type electric motor, for example, is employed in the structure illustrated in FIG. 1 of the first embodiment, the present invention is not limited thereto. The electric motor may be an inner rotor-type electric motor, or an axial gap-type electric motor. In addition, it may be a stepping motor.

In addition, although the rotor holder is fixed to the shaft in each of the above-described embodiments, the invention is not limited thereto. The rotor holder and the shaft may be a connected member. In other words, the rotor holder and the shaft may be a single member. If the rotor holder and the shaft are a connected member, the number of parts can be reduced.

In addition, in the structures from FIG. 1 to FIG. 4, the shaft itself may be omitted and the first bearing may be located between the casing and the rotor holder. In that way, a hole penetrating in the axial direction can be secured on an inner side of the rotor holder in the radial direction. Therefore, a part of electric wiring can be set to pass through the hole.

In addition, in each of the above-described embodiments, the casing is composed of a single member. The casing, however, may be composed of a plurality of members. In addition, although the output part 40 has been described as being rotated in the above-described embodiments, the invention is not limited thereto, and the output part 40 may be fixed and output from the casing 10.

Although the flexible gear is set to be a so-called hat-type, the invention is not limited thereto, and for example, a cylindrical cup-type flexible gear may be used.

For a material of each member constituting the speed reducer with an electric motor, for example, a high strength metal may be used. However, a material of each member is not necessarily limited to a metal as long as the material can withstand a load imposed at the time of use.

In addition, detailed shapes of the speed reducer with an electric motor may be different from those illustrated in each drawing of the present application. In addition, elements appearing in the above-described embodiments and the modified example may be appropriately combined within a range in which inconsistency does not occur.

INDUSTRIAL APPLICABILITY

The present invention can be used for a speed reducer with an electric motor.

The invention claimed is:

1. A speed reducing unit with an electric motor, comprising:
   a casing;
   an electric motor having a rotating part that rotates around an axis of the casing;
   a speed reduction mechanism that transmits a rotational motion of the electric motor while decelerating the rotational motion;
   an output part that rotates at a decelerated rotation speed;
   a first bearing that rotatably connects the casing or a member fixed to the casing to the rotating part; and
   a second bearing that rotatably connects the casing to the output part,
   wherein the speed reduction mechanism is a speed reduction mechanism having:
   an elliptical cam that rotates together with the rotating part,
   a flexible external gear that deforms according to the rotation of the elliptical cam,
   a flexible bearing that is located between the elliptical cam and the flexible external gear, and
   a movable internal gear that rotates together with the output part,
   in which the flexible external gear and the movable internal gear are engaged with each other, and the flexible external gear and the movable internal gear rotate relative to each other due to a difference in the number of teeth, and
   wherein the electric motor has:
   a rotor holder that is part of the rotating part and that rotates together with the elliptical cam,
   a rotor magnet that is fixed to the rotor holder, and
   a stator that is fixed to the casing or a member fixed to the casing and that is opposed to the rotor magnet,
   in which the rotor holder has a rotor-holder lid part that is opposed to the stator in an axial direction directly or via another member, and
   positions of the rotor-holder lid part and the flexible bearing in the axial direction at least partially overlap.

2. The speed reducing unit with an electric motor according to claim 1,
   wherein the elliptical cam and the rotor holder are connected together.

3. The speed reducing unit with an electric motor according to claim 1,
   wherein the elliptical cam and the rotor holder are connected together, and
   wherein the rotor holder has:
   a cylindrical fixing part that is positioned at an inner end of the rotor-holder lid part and is fixed to a shaft, and
   a tubular part that is positioned at an outer end of the rotor-holder lid part and hanging downward from the rotor-holder lid part in the axial direction,
   wherein the tubular part has the elliptical cam.

4. The speed reducing unit with an electric motor according to claim 3, comprising:

an enlarged diameter part having a diameter increasing toward an upper side in the axial direction at a portion of the fixing part connecting to the rotor-holder lid part.

5. The speed reducing unit with an electric motor according to claim 3,
wherein the rotor-holder lid part has a connecting part whose thickness in the axial direction increases toward the tubular part.

6. The speed reducing unit with an electric motor according to claim 3,
wherein the tubular part has a groove positioned below the elliptical cam and an annular part positioned below the groove.

7. The speed reducing unit with an electric motor according to claim 1,
wherein there is a groove between the elliptical cam and the flexible bearing.

8. The speed reducing unit with an electric motor according to claim 1,
wherein the rotating part has a shaft disposed coaxially with a center axis, and
wherein the rotor holder and the shaft are connected together.

\* \* \* \* \*